United States Patent
Kimoto

(10) Patent No.: US 9,181,902 B2
(45) Date of Patent: Nov. 10, 2015

(54) FUEL TANK AND METHOD FOR PRODUCING SAME

(75) Inventor: Junya Kimoto, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 326 days.

(21) Appl. No.: 13/881,131

(22) PCT Filed: Nov. 17, 2010

(86) PCT No.: PCT/JP2010/070456
§ 371 (c)(1),
(2), (4) Date: Apr. 23, 2013

(87) PCT Pub. No.: WO2012/066649
PCT Pub. Date: May 24, 2012

(65) Prior Publication Data
US 2013/0239931 A1 Sep. 19, 2013

(51) Int. Cl.
*F02M 25/06* (2006.01)
*F02M 25/08* (2006.01)
(Continued)

(52) U.S. Cl.
CPC ............... *F02M 25/06* (2013.01); *B60K 15/03* (2013.01); *F02M 25/089* (2013.01);
(Continued)

(58) Field of Classification Search
CPC . F02M 25/08; F02M 25/0854; F02M 37/103; F02M 37/106; F02M 59/44; F02M 2023/225; B60K 15/03519; B60K 15/0406
USPC ......... 123/495, 497, 509, 510, 516, 519–521; 220/4.12–4.14, 562
See application file for complete search history.

(56) References Cited

U.S. PATENT DOCUMENTS 4,919,103 A * 4/1990 Ishiguro et al. ............... 123/514
4,952,347 A 8/1990 Kasugai
(Continued)

FOREIGN PATENT DOCUMENTS

GB 2428415 A 1/2007
JP 1980154251 A 12/1980
(Continued)

OTHER PUBLICATIONS

Office Action dated Jul. 14, 2014 for German Patent Application No. DE112010006003.7 (11 pages).
(Continued)

*Primary Examiner* — John Kwon
*Assistant Examiner* — Johnny H Hoang
(74) *Attorney, Agent, or Firm* — Conley Rose, P.C.

(57) ABSTRACT

An object of the invention is to increase efficiency in an operation of joining an upper shell and a lower shell and to enhance reliability of a fuel tank against leakage.
The fuel tank according to the present invention includes: a fuel tank body (10*m*) which is constituted by an upper shell (12) and a lower shell (14); a fuel supply device (30) which is installed in the fuel tank body (10*m*) and pressure-feeds fuel in the fuel tank body (10*m*) to an internal combustion engine (E) of a vehicle; and a fuel vapor treating apparatus (20) which is configured to enable adsorption of fuel vapor, wherein the fuel supply device (30) and the fuel vapor treating apparatus (20) are mounted to the upper shell (12), and pipe (20*a*), (20*p*), (20*t*), (43), and (31) and wires (44) and (32) of the fuel supply device (30) and the fuel vapor treating apparatus (20) are configured to penetrate a wall of the upper shell (12).

7 Claims, 7 Drawing Sheets

(51) Int. Cl.
*F02M 37/10* (2006.01)
*F02M 37/20* (2006.01)
*F02M 37/00* (2006.01)
*B60K 15/035* (2006.01)
*B60K 15/03* (2006.01)
*B29C 65/20* (2006.01)
*B29C 65/00* (2006.01)
*B29L 31/00* (2006.01)

(52) U.S. Cl.
CPC ...... *F02M 25/0854* (2013.01); *F02M 37/0082* (2013.01); *F02M 37/103* (2013.01); *F02M 37/106* (2013.01); *F02M 37/20* (2013.01); *B29C 65/20* (2013.01); *B29C 66/1312* (2013.01); *B29C 66/54* (2013.01); *B29C 66/71* (2013.01); *B29C 66/7234* (2013.01); *B29L 2031/7172* (2013.01); *B60K 15/03504* (2013.01); *B60K 2015/03032* (2013.01); *B60K 2015/03453* (2013.01); *Y10T 29/49231* (2015.01)

(56) References Cited

U.S. PATENT DOCUMENTS

| | | | |
|---|---|---|---|
| 5,590,697 A * | 1/1997 | Benjey et al. | 141/59 |
| 6,338,420 B1 * | 1/2002 | Pachciarz et al. | 220/562 |
| 6,928,989 B2 * | 8/2005 | Powell | 123/509 |
| 8,919,326 B2 * | 12/2014 | Lim et al. | 123/509 |
| 2001/0054613 A1 * | 12/2001 | Straetz | 220/4.14 |
| 2003/0221675 A1 * | 12/2003 | Washeleski et al. | 123/497 |
| 2005/0178365 A1 | 8/2005 | Washeleski et al. | |
| 2005/0217735 A1 | 10/2005 | Firtion et al. | |
| 2009/0236350 A1 * | 9/2009 | Miura | 220/745 |
| 2010/0206793 A1 * | 8/2010 | Oku et al. | 210/172.4 |
| 2012/0074137 A1 * | 3/2012 | Randolph et al. | 220/86.2 |

FOREIGN PATENT DOCUMENTS

| | | |
|---|---|---|
| JP | 1987167728 A | 10/1987 |
| JP | 2004019507 A | 1/2004 |
| JP | 2005120844 A | 5/2005 |
| JP | 2005512872 A | 5/2005 |
| JP | 2006257935 A | 9/2006 |
| JP | 200983804 A | 4/2009 |
| JP | 2008155587 A | 4/2009 |
| WO | 03053731 A1 | 7/2003 |

OTHER PUBLICATIONS

PCT/JP2010/070456 International Search Report dated May 24, 2012 (4 p.).

* cited by examiner

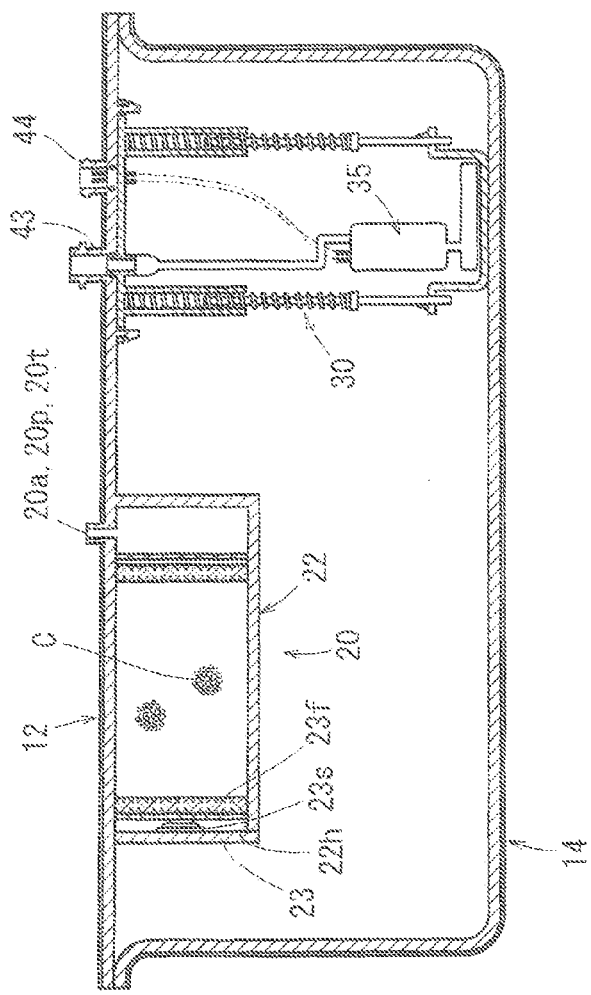
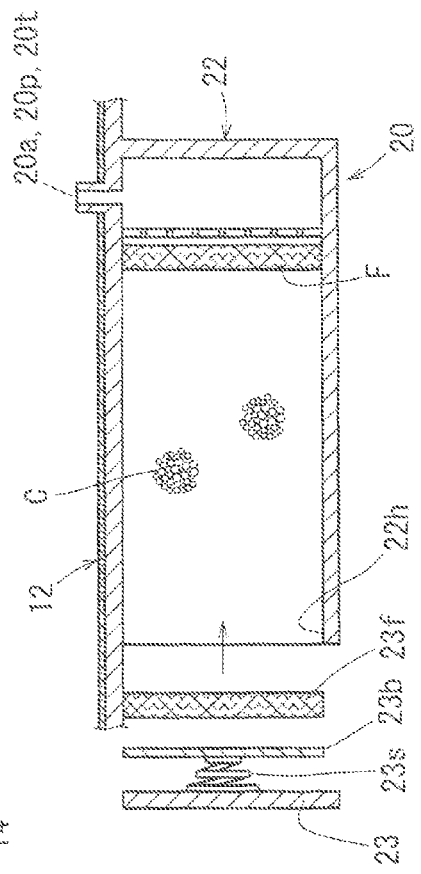
FIG. 5A
FIG. 5B

FUEL TANK AND METHOD FOR PRODUCING SAME

TECHNICAL FIELD

The present invention relates to a fuel tank including a fuel tank body that is constituted by an upper shell and a lower shell, a fuel supply device that is installed in the fuel tank body and pressure-feeds fuel in the fuel tank body to an internal combustion engine of a vehicle, and a fuel vapor treating apparatus that is configured to enable adsorption of fuel vapor, and a method of manufacturing the same.

BACKGROUND ART

A technique related to the fuel tank described above is disclosed in JP-A-2004-19507.

As illustrated in FIG. 7, the fuel tank is constituted by a fuel tank body 100 that stores fuel, a fuel supply device 120 that is installed in the fuel tank body 100, and a fuel vapor treating apparatus 125. The fuel tank body 100 is configured by joining an upper shell 101 and a lower shell 102 to each other at the positions of their respective flange portion 103 and 104. The fuel vapor treating apparatus 125 is configured to enable adsorption of fuel vapor in the fuel tank body 100, and is mounted to the ceiling portion of the upper shell 101. In addition, the fuel supply device 120 is mounted to the bottom portion of the lower shell 102, and a fuel pressure-feeding pipe 122 of the fuel supply device 120 and a power cable 124 for a motor are connected to a pipe joint 123 and a connector 127 that are provided in the side surface of the lower shell 102.

In the fuel tank described above, the pipe joint 123 and the connector 127 to which the fuel pressure-feeding pipe 122 of the fuel supply device 120 and the power cable 124 are respectively connected are provided in the side surface of the lower shell 102. That is, points that need sealing are at positions lower than that of the joining surface between the upper shell 101 and the lower shell 102, and points that need sealing occur even in a case where the feel liquid level is lower than the joining surface. Therefore, reliability against leakage is reduced.

When the pipe joint 123 and the connector 127 described above are provided in the upper shell 101 in order to improve the aspects, the fuel pressure-feeding pipe 122 and the power cable 124 are installed to be suspended between the upper shell 101 and the lower shell 102. Therefore, the fuel pressure-feeding pipe 122 and the power cable 124 act as obstructions during joining of the upper shell 101 and the lower shell 102, and efficiency in the joining operation is reduced.

Accordingly, there has been a need for improved fuel tank in order to increase efficiency in an operation of joining an upper shell and a lower shell and to enhance reliability of a fuel tank against leakage.

BRIEF SUMMARY OF THE INVENTION

In a first aspect of this disclosure, a fuel tank includes: a fuel tank body which is constituted by an upper shell and a lower shell; a fuel supply device which is installed in the fuel tank body and pressure-feeds fuel in the fuel tank body to an internal combustion engine of a vehicle; and a fuel vapor treating apparatus which is configured to enable adsorption of fuel vapor, wherein the fuel supply device and the fuel vapor treating apparatus are mounted to the upper shell, and a pipe and a wire of the fuel supply device and the fuel vapor treating apparatus are configured to penetrate a wall of the upper shell.

Here, the pipe and the wire also include ports and the like besides a pipe joint or a connector.

According to the first aspect, since the pipe and the wire of the fuel supply device and the fuel vapor treating apparatus are configured to penetrate the wall of the upper shell, there is no need to provide a seal portion at a position lower than that of the joining surface between the upper shell and the lower shell.

Moreover, since the fuel supply device and the fuel vapor treating apparatus are mounted to the upper shell, the pipes and the wires of the fuel supply device and the fuel vapor treating apparatus can be integrated in the upper shell. That is, since the pipes and the wires are not suspended between the upper shell and the lower shell, during an operation of joining the upper shell and the lower shell, the pipes and the wires do not act as obstructions, and efficiency in the joining operation is improved.

According to a second aspect of this disclosure, a part of a container of a canister included in the fuel vapor treating apparatus is molded integrally with the upper shell.

Therefore, compared to a configuration in which the container of the canister and the upper shell are manufactured separately and the canister is assembled to the upper shell, material saving can be achieved.

According to a third aspect of this disclosure, the fuel supply device includes an engaging portion, and the fuel supply device is configured to be mounted to the upper shell by engaging the engaging portion of the fuel supply device with an engaged portion that is integrally molded with the upper shell.

Accordingly, mounting of the fuel supply device to the upper shell is facilitated.

According to a fourth aspect of this disclosure, a container of a canister included in the fuel vapor treating apparatus includes an engaging portion, and the canister is configured to be mounted to the upper shell by engaging the engaging portion of the container of the canister with an engaged portion that is molded integrally with the upper shell.

Accordingly, the completed canister can be mounted to the upper shell. Moreover, mounting of the canister to the upper shell is facilitated.

According to a fifth aspect of this disclosure, the upper shell is formed in a flat plate shape.

Accordingly, for example, when a part of a container of a canister is injection-molded integrally with the upper shell, demolding along the upper shell is possible.

According to a sixth aspect of this disclosure, a method of manufacturing a fuel tank including a fuel tank body which is constituted by an upper shell and a lower shell, a fuel supply device which is installed in the fuel tank body and pressure-feeds fuel in the fuel tank body to an internal combustion engine of a vehicle, and a fuel vapor treating apparatus which is configured to enable adsorption of fuel vapor, including: a step of integrally molding a container body of a canister of the fuel vapor treating apparatus and an engaged portion that is engaged with an engaging portion of the fuel supply device with the upper shell; a filling step of filling the container body of the canister with an adsorbent and blocking an opening of the container body; a step of mounting the fuel supply device to the upper shell by engaging the engaging portion of the fuel supply device with an engaged portion of the upper shell before or after the filling step; and a step of joining the upper shell to the lower shell that is molded in a predetermined shape.

According to this disclosure, efficiency in the operation of joining the upper shell and the lower shell is increased, and reliability of the fuel tank against leakage is enhanced.

BRIEF DESCRIPTION OF DRAWINGS

FIG. 5A illustrates a schematic longitudinal cross-sectional view illustrating the configuration of a fuel tank according to a modification example of Embodiment 1, and FIG. 5B is a longitudinal cross-sectional view illustrating an assembly procedure of a canister part of FIG. 5A.

DESCRIPTION OF EMBODIMENTS

Embodiment 1

Hereinafter, description of a fuel tank according to Embodiment 1 will be provided on the basis of FIGS. 1 to 6. The fuel tank according to this embodiment is a fuel tank with a canister to be used in a vehicle.

<Summary of Fuel Tank 10>

Figure 1:
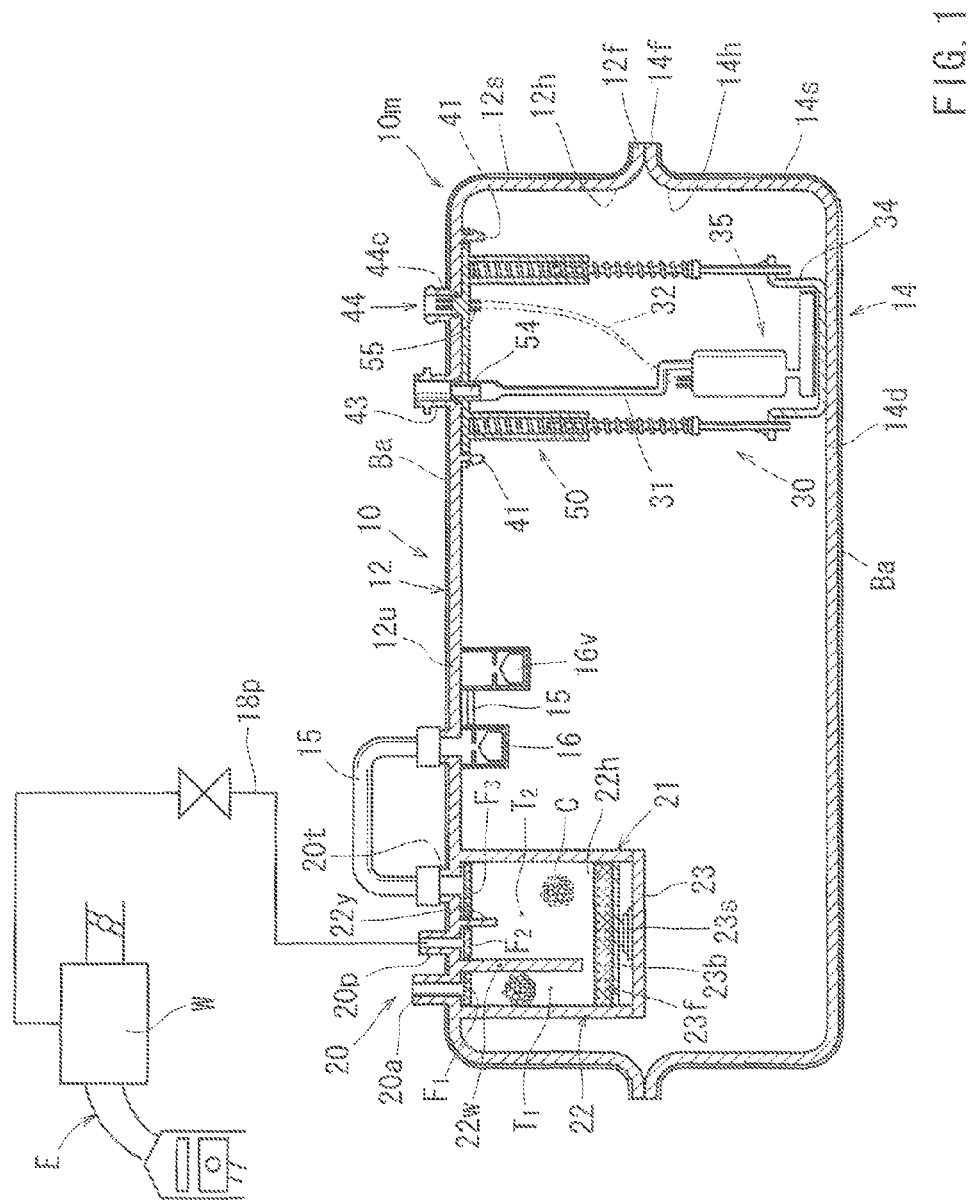
FIG. 1 is a schematic longitudinal cross-sectional view illustrating the configuration of a fuel tank according to Embodiment 1 of the present invention.

As illustrated in FIG. 1, the fuel tank 10 includes a fuel tank body 10m constituted by an upper shell 12 and a lower shell 14. The upper shell 12 and the lower shell 14 are resin injection-molded products, and the surfaces thereof are covered with a barrier layer Ba having fuel permeation resistance. Here, as a resin that is a body material of the upper shell 12 and the lower shell 14, for example, high-density polyethylene (HDPE) is used, and as a material of the barrier layer Ba, for example, an ethylene vinyl alcohol copolymer (EVOH) is used.

The upper shell 12 is formed by an upper plate portion 12u and a side plate portion 12s in a square container shape in which the lower side thereof is open, and a flange portion 12f is formed at a peripheral edge of a lower side opening 12h thereof. In addition, at a predetermined position of the rear side of the upper plate portion 12u of the upper shell 12, a container body 22 of a canister 20 described later is formed to protrude downward. Furthermore, in the upper plate portion 12u of the upper shell 12, an atmosphere port portion 20a, a purge port portion 20p, and a tank port portion 20t which communicate with the inside of the container body 22 of the canister 20 are formed.

Figure 2A:
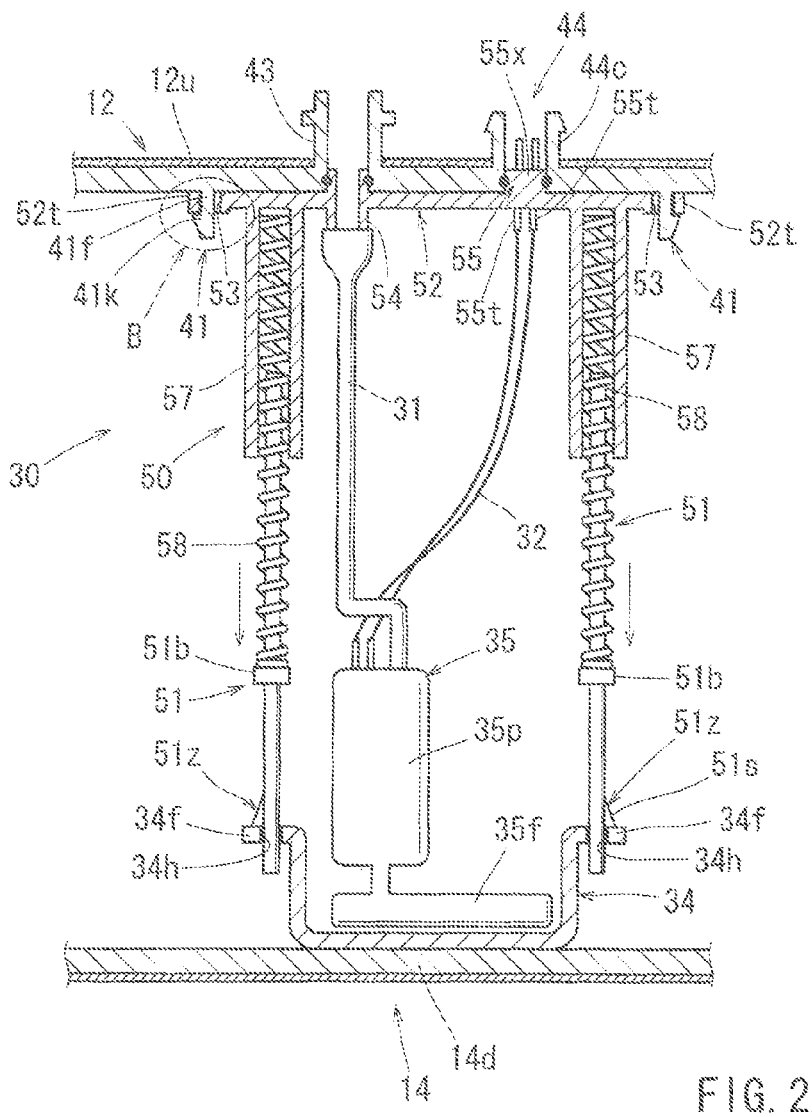
FIG. 2A illustrates a longitudinal cross-sectional view illustrating a mounting configuration of a fuel supply device.
Figure 2B:
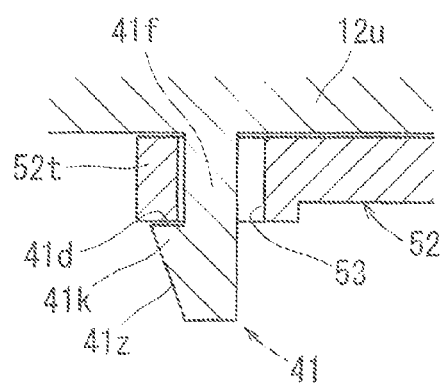
FIG. 2B is an enlarged view of a B part of FIG. 2A.

In addition, on the rear side of the upper plate portion 12u of the upper shell 12, a plurality of engaging claw portions 41 (two portions are shown in FIG. 1) to which a fuel supply device 30 described later is mounted are formed to protrude downward at positions distant from the container body 22 of the canister 20. As illustrated in FIGS. 2A and 2, each engaging claw portion 41 is constituted by a flat plate portion 41f, a wedge-shaped hook portion 41k formed at the tip of the flat plate portion 41f. The flat plate portion 41f of the engaging claw portion 41 is configured to be elastically deformable in the thickness direction (the horizontal direction in FIGS. 2A and 2B), and a stepped portion 41d is formed between the flat plate portion 41f and the hook portion 41k (see FIG. 2B. In addition, the fuel supply device 30 is mounted to the upper shell 12 by engaging the plurality of engaging claw portions 41 of the upper shell 12 with a plurality of claw receiving holes 53 of the fuel supply device 30 as described later.

Moreover, in the upper plate portion 12u of the upper shell 12, a pipe joint portion 43 to which a pipe joint connection portion 54 of the fuel supply device 30 is connected and a case portion 44c of a connector 44 in which a connector body portion 55 of the fuel supply device 30 is inserted are formed.

As illustrated in FIG. 1, a lower shell 14 is formed by a bottom plate portion 14d and a side plate portion 14s in a square container shape in which the upper side thereof is open, and a flange portion 14f is formed at the peripheral edge of an upper side opening 14h thereof.

In addition, the flange portion 14f of the lower shell 14 and the flange portion 12f of the upper shell 12 are joined by, for example, a heat plate welding method, thereby forming a fuel tank body 10m.

<Canister 20>

The canister 20 is configured to enable adsorption of fuel vapor which is generated in the fuel tank body 10m during parking of a vehicle (an engine stopped state) and to enable the adsorbed fuel vapor to be supplied to an intake pipe W of the internal combustion engine E during running. As illustrated in FIG. 1, the canister 20 includes a sealed type square container 21, and the square container 21 is constituted by the container body 22 of a lower portion open type and a cover material 23 that blocks a lower portion opening 22h of the container body 22. The container body 22 is molded integrally with the upper shell 12 as described above, and a partition wall 22w is formed in the ceiling portion of the container body 22 to protrude downward. In addition, the inside of container body 22 is partitioned by the partition wall 22w to the left and the right excluding the vicinity of the lower portion opening 22h, and a left passage T1 and a right passage T2 which communicate with each other at the lower side position are formed inside the container body 22. The left passage T1 of the container body 22 communicates with the atmosphere port portion 20a via a first filter F1 and the right passage T2 of the container body 22 communicates with the purge port portion 20p and the tank port portion 20t via a second filter F2 and a third filter F3. Here, the upper portion of the right passage T2 of the container body 22 is divided into a space on the purge port portion 20p side and a space on the tank port portion 20t side by a low vertical wall 22v.

The left passage T1 and the right passage T2 of the container body 22 are filled with an adsorbent C made of activated carbon or the like to which the fuel vapor is adsorbed. Moreover, a filter 23f a pressing flat plate 23b, and a spring 23s for pressing the adsorbent C in the upward direction are disposed on the inside of the lower portion opening 22h of the container body 22, and the lower portion opening 22h of the container body 22 is blocked by the cover material 23.

The tank port portion 20t of the canister 20 is connected to a cutoff valve 16 mounted to the ceiling portion of the fuel tank body 10m and a fill-up regulating valve 16v via a vapor pipe 15. The cutoff valve 16 is a valve that is closed by an overturning of a vehicle or the like, and is typically held in an open state. The fill-up regulating valve 16v is a valve that prevents a fuel liquid level in the fuel tank body 10m from exceeding the upper limit value during fueling, and is held in a closed state when the fuel tank is filled up and held in an open state except when the fuel tank is filled up.

An outside purge pipe 18p that is able to communicate with the intake pipe W of the internal combustion engine E is connected to the purge port portion 20p of the canister 20.

In addition, the atmosphere port portion 20a of the canister 20 is open to the atmosphere via an atmosphere pipe (illustration is omitted).

According to the configuration described above, for example, when the pressure in the fuel tank body 10m is increased by a temperature rise or the like in a stopped state of the internal combustion engine E, gas (fuel vapor+air) in the fuel tank body 10m flows into the canister 20 through the vapor pipe 15 and the tank port portion 20t from the fill-up regulating valve 16v and the cutoff valve 16. In addition, the fuel vapor that flows into the canister 20 is adsorbed to the adsorbent C while flowing from the right passage T2 to the left passage T1, and air from which the fuel vapor is removed diffuses to the outside from the atmosphere port portion 20a via the atmosphere pipe.

In addition, when the inside of the intake pipe W has a negative pressure due to the driving of the internal combustion engine E, the inside of the canister 20 that communicates with the intake pipe W via the outside purge pipe 18p has a negative pressure, and air flows into the canister 20 from the atmosphere pipe and the atmosphere port 20a of the canister 20. In addition, the fuel vapor that is adsorbed to the adsorbent C is purged while the air flows from the left passage T1 to the right passage T2. Accordingly, the fuel vapor is desorbed from the adsorbent C, and the fuel vapor is suctioned into the intake pipe W of the internal combustion engine E through the purge port 20p of the canister 20 and the outside purge pipe 18p along with the air.

That is, the canister 20, the vapor pipe 15, the outside purge pipe 18p, and the like correspond to a fuel vapor treating apparatus of the present invention, and the atmosphere port portion 20a, the purge port portion 20p, and the tank port portion 20t correspond to pipes that are configured to penetrate the wall of the upper shell 12 in the present invention.

<Fuel Supply Device 30>

The fuel supply device 30 is a device for pressure-feeding fuel stored in the fuel tank body 10m to the internal combustion engine E, and as illustrated in the longitudinal cross-sectional view of FIG. 2A, is constituted by a reserve cup 34 having a hollow cylindrical shape with a bottom, a pump unit 35 stored in the reserve cup 34, and a mounting mechanism 50 for mounting the reserve cup 34 that houses the pump unit 35 to the upper shell 12.

The pump unit 35 includes a fuel pump 35p that is a motor-driven type, a filter 35f that filters the fuel suctioned into the fuel pump 35p, a pressure control mechanism (illustration is omitted) that controls the pressure of the fuel discharged from the fuel pump 35p to be a predetermined pressure, and a remaining fuel amount detecting portion (illustrated is omitted) that detects a fuel level in the reserve cup 34.

The reserve cup 34 is formed in a cylindrical container shape in which the upper portion thereof is open, and an opening (illustration is omitted) is formed at the lower end portion of the reserve cup 34. In addition, the inside and outside of the reserve cup 34 communicate with each other by the opening. In addition, a flange portion 34f is formed at the peripheral edge of the upper portion opening of the reserve cup 34, and a through-hole 34h through which a support shaft 51 (described later) of the mounting mechanism 50 is able to be inserted is formed in the flange portion 34f.

<Mounting Mechanism 50 of Fuel Supply Device 30>

As illustrated in FIGS. 2A and 2B the mounting mechanism 50 of the fuel supply device 30 is constituted by a ceiling plate portion 52 that is mounted to the rear side of the upper plate portion 12u of the upper shell 12 and a plurality of the support shafts 51 that are connected to the ceiling plate portion 52 to be vertically movable in the axial direction.

The ceiling plate portion 52 is formed in a substantially circular plate shape, and thick portions 52t are provided at the outer peripheral edge of the ceiling plate portion 52. In addition, the claw receiving holes 53 that are configured to enable the plurality of engaging claw portions 41 of the upper shell 12 to be engaged thereto are provided at the positions of the thick portions 52t of the ceiling plate portion 52. Each of the claw receiving hole 53 is a square through-hole, and is formed to have a dimension through which the hook portion 41k of the engaging claw portion 41 of the upper shell 12 passes. In addition, as illustrated in FIG. 2B, in order to enable an inclined lower surface 41z of the hook portion 41k of the engaging claw portion 41 to abut on the outer peripheral edge of the claw receiving hole 53, the position of the claw receiving hole 53 is positioned further toward the inner side in the radial direction than the engaging claw portion 41. Accordingly, while the engaging claw portion 41 of the upper shell 12 is inserted into the claw receiving hole 53, the inclined lower surface 41z of the hook portion 41k of the engaging claw portion 41 abuts on the peripheral edge of the claw receiving hole 53 and slides, and the flat plate portion 41f of the engaging claw portion 41 is elastically deformed toward the inside in the radial direction. In addition, in a state in which the hook portion 41k of the engaging claw portion 41 passes through the claw receiving hole 53, the flat plate portion 41f of the engaging claw portion 41 is returned to its original state (widens outward in the radial direction) by elastic force, and the stepped portion 41d of the engaging claw portion 41 is caught on the lower peripheral edge of the claw receiving hole 53 (see FIGS. 2A and 2B).

Here, the thickness dimension of the thick portion 52t of the ceiling plate portion 52 in which the claw receiving hole 53 is formed is set to be substantially the same as the distance from the stepped portion 41d of the engaging claw portion 41 of the upper shell 12 to the rear surface of the upper plate portion 12u of the upper shell 12. Therefore, in a state where the engaging claw portion 41 of the upper shell 12 is engaged with the claw receiving hole 53 of the ceiling plate portion 52, the upper surface of the ceiling plate portion 52 abuts on the rear surface of the upper plate portion 12u of the upper shell 12.

That is, the claw receiving hole 53 of the ceiling plate portion 52 corresponds to an engaging portion of the fuel supply device of the present invention, and the engaging claw portion 41 of the upper shell 12 corresponds to an engaged portion that is molded integrally with the upper shell of the present invention.

At a position close to the center of the ceiling plate portion 52, as illustrated in FIG. 2A, the pipe-like pipe joint connection portion 54 is formed at a position corresponding to the pipe joint portion 43 of the upper shell 12. The pipe joint connection portion 54 is a joint that connects a fuel pressure-feeding pipe 31 of the pump unit 35 to the pipe joint portion 43 of the upper shell 12, and is configured so that the fuel pressure-feeding pipe 31 is connected to a part protruding downward from the ceiling plate portion 52. In addition, the upper portion of the pipe joint connection portion 54 protruding upward from the ceiling plate portion 52 is configured to be inserted and connected to the pipe joint portion 43 of the upper shell 12.

In addition, in the ceiling plate portion 52, the connector body portion 55 is provided at a position corresponding to the case portion 44c of the connector 44 of the upper shell 12. The connector 44 is a member connecting a composite cable 32 of the pump unit 35 to a cable (illustration is omitted) outside the tank, and an upper portion protrusion 55x of the connector body portion 55 that is provided in the ceiling plate portion 52 is configured to be fitted into the case portion 44c.

On the lower surface side of the ceiling plate portion 52, a plurality of cylindrical portions 57 (two portions in FIG. 2A) are formed to protrude downward at positions on the inside in the radial direction of the thick portion 52t. The cylindrical portion 57 is a cylindrical body that supports the support shaft 51 to be guided in the axial direction (vertical direction), and the upper side portion of the support shaft 51 is inserted into the corresponding cylindrical portion 57 from the below. In addition, on the inside of the cylindrical portion 57, a coil spring 58 is attached at a position between the cylindrical portion 57 and the support shaft 51. The coil spring 58 impels the support shaft 51 in such a direction to be extruded in the downward direction from the cylindrical portion 57, and the upper end of the coil spring 58 is supported by the upper surface of the inside (the lower surface of the ceiling plate portion 52) of the cylindrical portion 57. In addition, in the center part of the support shaft 51, a flange-shaped spring receiving portion 51b is formed, and the lower end of the coil spring 58 is supported by the spring receiving portion 51b.

In addition, in the vicinity of the lower end portion of the support shaft 51, a lock portion 51z that is formed in an upward wedge shape is provided. The lock portion 51z is configured to be held in an expanded state of protruding outward in the radial direction from the outer peripheral surface of the support shaft 51 by elastic force and in a stored state of being stored in the support shaft 51 against the elastic force. That is, when the lock portion 51z of the support shaft 51 passes through the through-hole 34h of the reserve cup 34 from the below as described later, an inclined surface 51s of the lock portion 51z is pressed by the peripheral edge of the through-hole 34h of the reserve cup 34, and thus the lock portion 51z is held in the stored state against the elastic force. In addition, in a state where the lock portion 51z passes through the through-hole 34h of reserve cup 34 and completely comes out of the through-hole 34h in the upward direction, the lock portion 51z is held in the expanded state by the elastic force. Accordingly, the lower end portion of the lock portion 51z is able to press the flange portion 34f of the reserve cup 34 from the above.

<Assembly Procedure of Canister 20>

Figure 3:
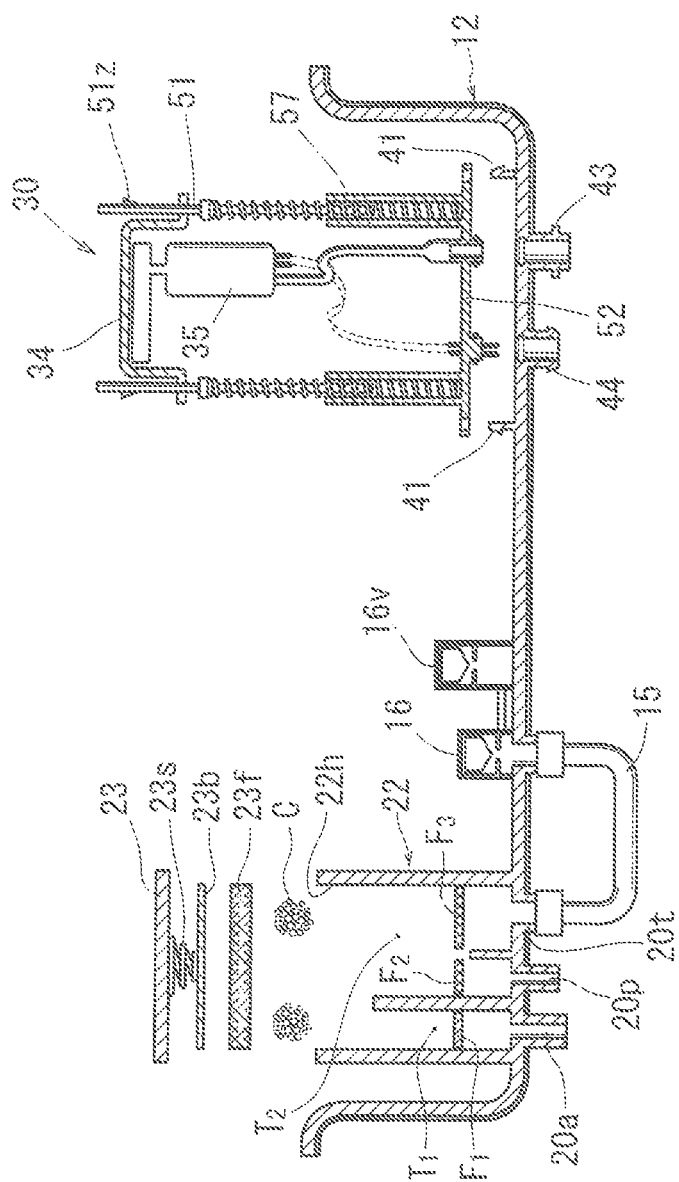
FIG. 3 is a schematic longitudinal cross-sectional view illustrating a method of manufacturing the fuel tank according to Embodiment 1.

Regarding assembly of the canister 20, first, as illustrated in FIG. 3, in a state where the upper shell 12 is vertically reversed, the first filter F1, the second filter F2, and the third filter F3 are set in their respective positions from the lower portion opening 22h of the container body 22. Next, the left passage T1 and the right passage T2 are filled with the adsorbent C from the lower portion opening 22h of the container body 22. In addition, in a state where the container body 22 is filled with the adsorbent C, the entire upper surface of an aggregated part of the adsorbent C (the upper surface in FIG. 3) is covered with the filter 23f, and the filter 23f is pressed by the pressing flat plate 23b. Moreover, in a state where the spring 23s is set between the pressing flat plate 25h and the cover material 23, the peripheral edge of the cover material 23 is joined to the peripheral edge of the lower portion opening 22h of the container body 22 by welding or the like. Accordingly, assembly of the canister 20 is completed.

<Mounting Procedure of Fuel Supply Device 30>

Figure 4:
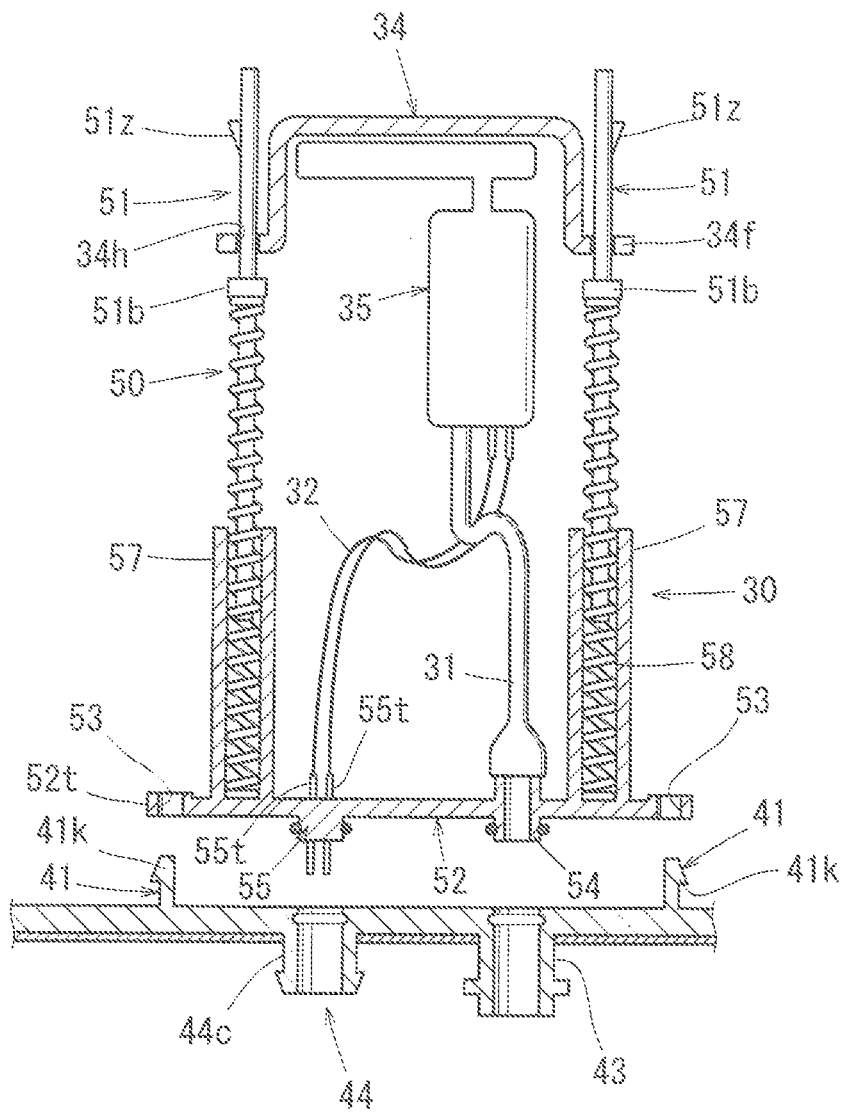
FIG. 4 is a longitudinal cross-sectional view illustrating a mounting procedure of the fuel supply device.

In addition, as illustrated in FIG. 4, mounting of the fuel supply device 20 is performed by mounting the mounting mechanism 50 in a vertically reversed state to the upper shell 12 in a vertically reversed state in the same manner. At this time, the support shaft 51 of the mounting mechanism 50 passes through the through-hole 34h of the reserve cup 34 including the pump unit 35, and the flange portion 34f of the reserve cup 34 is held between the lock portion 51z of the support shaft 51 and the spring receiving portion 51b. In addition, the fuel pressure-feeding pipe 31 of the pump unit 35 is connected to the pipe joint connection portion 54 of the ceiling plate portion 52 of the mounting mechanism 50, and the composite cable 32 of the pump unit 35 is connected to a terminal 55t of the connector body portion 55 of the ceiling plate portion 52. In this state, the engaging claw portions 41 of the upper shell 12 are caused to respectively pass through the plurality of claw receiving holes 53 formed in the ceiling plate portion 52 of the mounting mechanism 50, and the hook portions 41k of the engaging claw portions 41 are engaged with the peripheral edges of the claw receiving holes 53. Accordingly, the ceiling plate portion 52 may be fixed to the upper shell 12. In addition, simultaneously with fixing of the ceiling plate portion 52, the pipe joint connection portion 54 of the ceiling plate portion 52 is connected to the pipe joint portion 43 of the upper shell 12, and the connector body portion 55 of the ceiling plate portion 52 is fitted into the case portion 44c of the connector 44 of the upper shell 12. In this state, mounting of the fuel supply device 30 is completed.

That is, the pipe joint portion 43 of the upper shell 12 to which the fuel pressure-feeding pipe 31 and the pipe joint connection portion 54 of the ceiling plate portion 52 are connected corresponds to a pipe that penetrates the wall of the upper shell in the present invention, and the connector 44 to which the composite cable 32 is connected corresponds to a wire that penetrates the wall of the upper shell in the present invention.

In this manner, when assembly of the canister 20 and mounting of the fuel supply device 30 to the upper shell 12 are completed, the flange portion 14f of the lower shell 14 is joined to the flange portion 12f of the upper shell 12 in the vertically reversed state by, for example, a heat plate welding method. In addition, after completing the fuel tank body 10m, the upper shell 12 of the fuel tank body 10m is placed on the upper side, and the lower shell 14 is placed on the lower side, which is referred to as a normally placed state. Accordingly, the pump unit 35 and the reserve cup 34 descend along the support shaft 51 of the mounting mechanism 50 under their own weights. In addition, while the reserve cup 34 and the like descend, when the peripheral edge of the through-hole 34h of the reserve cup 34 presses the inclined surface 51s of the lock portion 51z of the support shaft 51 from the above, the lock portion 51z is inserted into the through-hole 34h of the reserve cup 34 with the diameter reduced by elastic force. Moreover, in a state where the lock portion 51z completely comes out of the through-hole 34h of the reserve cup 34 in the upward direction, the lock portion 51z is expanded by elastic force, and as illustrated in FIG. 2A, the lower end of the lock portion 51z presses the flange portion 34f of the reserve cup 34 from the above.

Here, when the reserve cup 34 and the like descend under their own weights, the fuel pump and the like in the reserve cup 34 may be attracted to the lower side from the outside of the fuel tank body 10m by a magnet or the like.

In addition, an example in which, after the flange portion 12f of the upper shell 12 and the flange portion 14f of the lower shell 14 are joined to each other, the flange portion 34f of the reserve cup 34 is pressed by the lock portion 51z of the support shaft 51 as the reserve cup 34 descends is illustrated. However, after the flange portion 34f of the reserve cup 34 is pressed by the lock portion 51z of the support shaft 51, the flange portion 12f of the upper shell 12 and the flange portion 14f of the lower shell 14 may be joined to each other.

<Advantages of Fuel Tank 10 According to this Embodiment>

In the fuel tank 10 according to this embodiment, as illustrated in FIG. 1, since the fuel supply device 30 and the pipes 20a, 20p, 20t, and 43 (31) and the wires 44 (32) of the canister 20 are configured to penetrate the wall of the upper shell 12, there is no need to provide a seal portion at a position lower than that of the joining surface between the upper shell 12 and the lower shell 14.

Moreover, since the fuel supply device 30 and the canister 20 are mounted to the upper shell 12, the pipes 43 (31) and the wires 44 (32) of the fuel supply device 30 and the canister 20 may be integrated in the upper shell 12. That is, since the pipe 31 and the wire 32 are not suspended between the upper shell 12 and the lower shell 14, efficiency in an operation of joining the upper shell 12 to the lower shell 14 is increased.

In addition, since a part of the square container 21 of the canister 20 is molded integrally with the upper shell 12, compared to a configuration in which the square container 21 of the canister 20 and the upper shell 12 are manufactured separately and the canister 20 is assembled to the upper shell 12, material saving may be achieved.

In addition, since the fuel supply device 30 is configured to be mounted to the upper shell 12 by engaging the claw receiving hole 53 (engaging portion) of the ceiling plate portion 52 of the fuel supply device 30 with the engaging claw portion 41 (engaged portion) that is molded integrally with the upper shell 12, mounting of the fuel supply device 30 to the upper shell 12 is facilitated.

Modification Example

Here, the present invention is not limited to the above-described embodiment, and may be modified in a scope that does not depart from the gist of the present invention. For example, in the fuel tank 10 according to the embodiment, an example in which the upper shell 12 is formed in a square container shape in which the lower side thereof is open is illustrated. However, the upper shell 12 may be formed in a flat plate shape as illustrated in FIG. 5A. Accordingly, for example, when the upper shell 12 and the container body 22 of the canister 20 are integrally injection-molded, demolding along the upper shell 12 having the flat plate shape is possible. Therefore, the container body 22 of the canister 20 may be molded to be thin and long along the upper shell 12.

The container body 22 of the canister 20 is molded to be thin and long along the upper shell 12, and a transverse portion opening 22h is formed on one end side in the horizontal direction (left end side in FIGS. 5A and 5B). That is, in the container body 22 of the canister 20 illustrated in FIG. 1, the partition wall 22w, the left passage T1, and the right passage T2 are formed to extend vertically, whereas, in the container body 22 of the canister 20 illustrated in FIGS. 5A and 5B, the partition, the left passage, and the right passage of which the illustration is omitted are formed to extend along the upper shell 12. Therefore, the actions of the canister 20 illustrated in FIG. 1 and the canister 20 illustrated in FIGS. 5A and 5B are the same. In addition, the atmosphere port portion 20a, the purge port portion 20p, and the tank port portion 20t of the canister 20 of FIGS. 5A and 5B are formed in a state of being distant from each other in a direction perpendicular to the surface of the figure.

In this manner, since the container body 22 of the canister 20 is molded to be thin and long along the upper shell 12 by forming the upper shell 12 in a flat plate shape, a large-size canister 20 may be installed in an gas layer part of the fuel tank 10 (a space upper than that of the liquid level when the fuel tank is filled up).

Figure 6A:
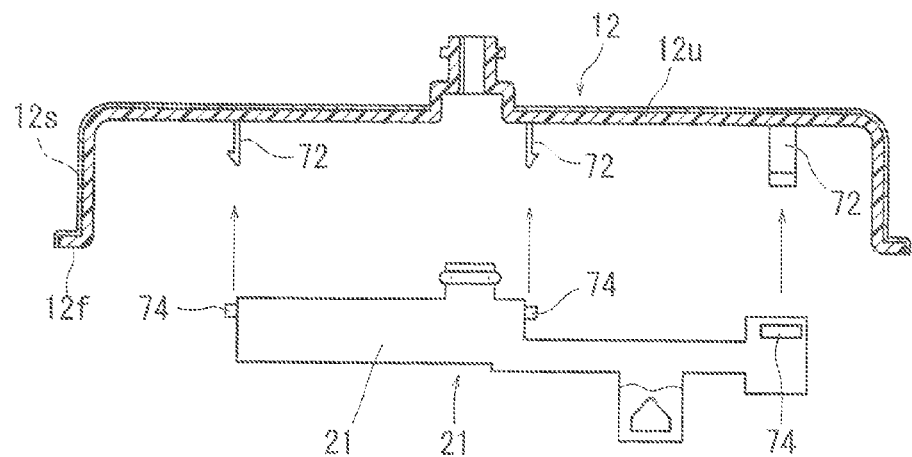
FIG. 6A illustrates a side view illustrating a mounting structure of a canister in a fuel tank according to a modification example of Embodiment 1.
Figure 6B:
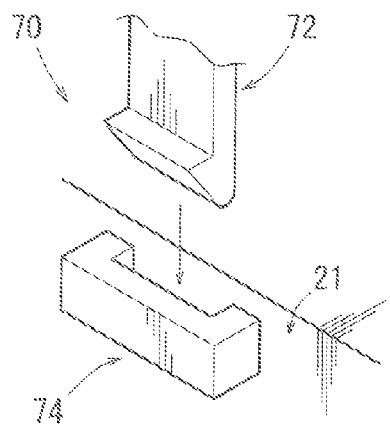
FIG. 6B is a perspective view illustrating an engaging mechanism.
Figure 7:
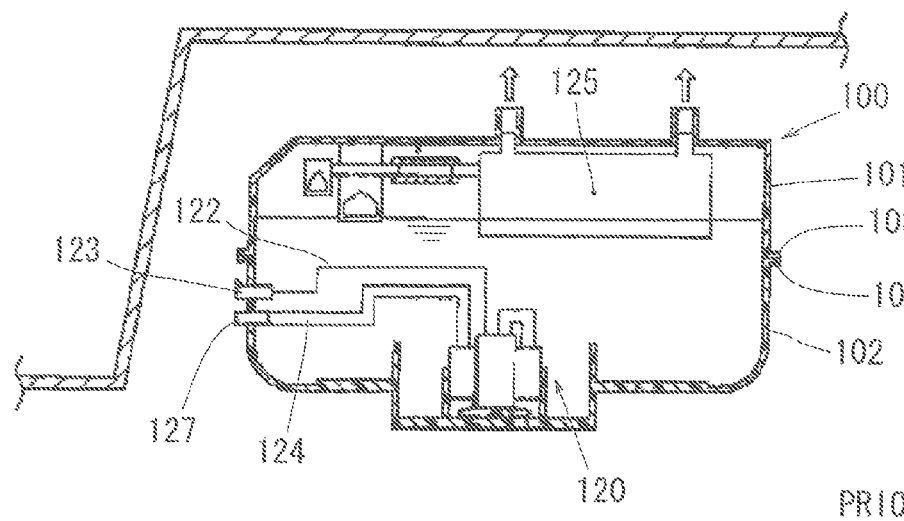
FIG. 7 is a schematic longitudinal cross-sectional view illustrating a conventional fuel tank.

In addition, in this embodiment, an example in which the upper shell 12 and the container body 22 of the canister 20 are integrally molded is illustrated. However, as illustrated in FIGS. 6A and 6B, the completed canister 20 may be mounted to the upper shell 12 by using an engaging mechanism 70. That is, the engaging mechanism 70 is constituted by a plurality of claw portions 72 formed to protrude toward the rear side of the upper plate portion 12u of the upper shell 12 and a plurality of claw receiving portions 74 formed in the container 21 of the canister 20, and the canister 20 is fixed to the ceiling portion of the upper shell 12 by respectively engaging the claw portions 72 with the claw receiving portions 74.

That is, the claw receiving portion 74 of the canister 20 corresponds to an engaging portion of the present invention, and the claw portion 72 of the upper shell 12 corresponds to an engaged portion of the present invention.

As such, since the completed canister 20 is able to be mounted to the upper shell 12, the canister 20 may be inspected singly in advance. Moreover, mounting of the canister 20 to the upper shell 12 is facilitated by using the engaging mechanism 70.

In addition, an example in which the engaging portion of the canister 20 is configured as the claw receiving portion 74 and the engaged portion of the upper shell 12 is configured as the claw portion 72 is illustrated. However, the engaging portion of the canister 20 may be configured as the claw portion 72 and the engaged portion of the upper shell 12 may be configured as the claw receiving portion 74.

Similarly, in this embodiment, an example in which the engaging portion of the fuel supply device 30 is configured as the claw receiving hole 53 of the ceiling plate portion 52 and the engaged portion of the upper shell 12 is configured as the engaging claw portion 41 is illustrated. However, the engaging portion of the fuel supply device 30 may be configured as the engaging claw portion 41 and the engaged portion of the upper shell 12 may be configured as the claw receiving hole 53.

In addition, in the fuel tank 10 of this embodiment, an example in which the lock portion 51z is provided at the tip (lower end) of the support shaft 51 in the mounting mechanism 50 of the fuel supply device 30 and the flange portion 34f of the reserve cup 34 is pressed by the lock portion 51z from the above is illustrated. However, a configuration in which the support shaft 51 is formed in a bolt shape and the flange portion 34f of the reserve cup 34 is pressed by a nut from the above and the below is possible.

The invention claimed is:

1. A fuel tank comprising:
   a fuel tank body which is constituted by an upper shell and a lower shell, upper shell has an upper plate portion having an inner surface;
   a fuel supply device which is installed in the fuel tank body and pressure-feeds fuel in the fuel tank body to an internal combustion engine of a vehicle; and
   a fuel vapor treating apparatus mounted to the upper shell and configured to enable adsorption of fuel vapor;
   wherein the fuel supply device includes a mounting mechanism configured to mount the fuel supply device to the upper plate portion, the mounting mechanism including a ceiling plate portion that engages the inner surface of the upper plate portion of the upper shell;
   wherein a pipe and a wire of the fuel supply device extend through the ceiling plate portion; and wherein the pipe and the wire of the fuel supply device and a pipe and a wire of the fuel vapor treating apparatus are configured to penetrate a wall of the upper shell.

2. The fuel tank according to claim 1,
wherein a part of a container of a canister included in the fuel vapor treating apparatus is molded integrally with the upper shell.

3. The fuel tank according to claim 1,
wherein the fuel supply device includes an engaging portion, and
the fuel supply device is configured to be mounted to the upper shell by engaging the engaging portion of the fuel supply device with an engaged portion that is molded integrally with the upper shell.

4. The fuel tank according to claim 1,
wherein a container of a canister included in the fuel vapor treating apparatus includes an engaging portion, and
the canister is configured to be mounted to the upper shell by engaging the engaging portion of the container of the canister with an engaged portion that is molded integrally with the upper shell.

5. The fuel tank according to claim 1,
wherein the upper plate portion of the upper shell is formed in a flat plate shape.

6. The fuel tank of claim 3, wherein the engaged portion comprises a claw portion;
wherein the engaging portion comprises a claw receiving hole extending through the ceiling plate portion; and
wherein the claw receiving hole in the ceiling plate portion is configured to receive the claw portion therethrough to mount the fuel supply device to the upper shell.

7. A method of manufacturing a fuel tank including a fuel tank body which is constituted by an upper shell and a lower shell, a fuel supply device which is installed in the fuel tank body and pressure-feeds fuel in the fuel tank body to an internal combustion engine of a vehicle, and a fuel vapor treating apparatus which is configured to enable adsorption of fuel vapor, the method comprising:
integrally molding a container body of a canister of the fuel vapor treating apparatus and an engaged portion that is engaged with an engaging portion of the fuel supply device with the upper shell;
filling the container body of the canister with an adsorbent and blocking an opening of the container body;
mounting the fuel supply device to an inner surface of an upper plate portion of the upper shell by:
inserting an engaging claw portion that is integrally molded on the inner surface into a claw receiving hole extending through a ceiling plate portion of a mounting mechanism; and
engaging the ceiling plate portion with the inner surface of the upper plate portion during the inserting of the engaging claw portion into the claw receiving hole; and
joining the upper shell to the lower shell, wherein the upper shell and the lower shell are molded in a predetermined shape.

\* \* \* \* \*